(12) United States Patent
Sanchez et al.

(10) Patent No.: US 10,309,863 B2
(45) Date of Patent: Jun. 4, 2019

(54) PROTECTING BODY FOR A FLEXIBLE POUCH, SYSTEM FOR CONTAINING A BIOPHARMACEUTICAL FLUID AND METHODS FOR USING SUCH A SYSTEM

(71) Applicant: SARTORIUS STEDIM NORTH AMERICA, Bohemia, NY (US)

(72) Inventors: Marc Sanchez, Patchogue, NY (US); Jonathan Cutting, East Setauket, NY (US)

(73) Assignee: SARTORIUS STEDIM NORTH AMERICA, Bohemia, NY (US)

( * ) Notice: Subject to any disclaimer, the term of this patent is extended or adjusted under 35 U.S.C. 154(b) by 131 days.

(21) Appl. No.: 15/343,959

(22) Filed: Nov. 4, 2016

(65) Prior Publication Data

US 2018/0128707 A1    May 10, 2018

(51) Int. Cl.
| | |
|---|---|
| *G01M 3/18* | (2006.01) |
| *G01M 3/32* | (2006.01) |
| *A61J 1/10* | (2006.01) |
| *A61J 1/14* | (2006.01) |
| *A61J 1/16* | (2006.01) |

(52) U.S. Cl.
CPC .......... *G01M 3/3218* (2013.01); *G01M 3/187* (2013.01); *G01M 3/3272* (2013.01); *A61J 1/10* (2013.01); *A61J 1/1468* (2015.05); *A61J 1/1475* (2013.01); *A61J 1/165* (2013.01)

(58) Field of Classification Search
CPC .......................... G01M 3/3218; G01M 3/187
See application file for complete search history.

(56) References Cited

U.S. PATENT DOCUMENTS

| | | | | |
|---|---|---|---|---|
| 5,309,750 A | * | 5/1994 | Riley | G01M 3/3218 73/49.3 |
| 2008/0127716 A1 | * | 6/2008 | Eliasson | G01M 3/363 73/45.4 |
| 2010/0326172 A1 | * | 12/2010 | Voute | G01M 3/3218 73/40.7 |
| 2012/0329577 A1 | * | 12/2012 | Anderl | A63B 37/0022 473/378 |

FOREIGN PATENT DOCUMENTS

EP    2 322 442 A1    5/2011

* cited by examiner

*Primary Examiner* — Paul M. West
(74) *Attorney, Agent, or Firm* — Young & Thompson

(57) ABSTRACT

The leak test for a flexible pouch specifically designed to contain a biopharmaceutical fluid includes the following steps:
 the flexible pouch is sandwiched between two plates which have an internal surface able to allow gas which escape from a hole on the flexible pouch flowing out of an external surface of the flexible pouch,
 a gas is introduced within the flexible pouch, and
 the pressure within the flexible pouch is measured.

16 Claims, 10 Drawing Sheets

PROTECTING BODY FOR A FLEXIBLE POUCH, SYSTEM FOR CONTAINING A BIOPHARMACEUTICAL FLUID AND METHODS FOR USING SUCH A SYSTEM

FIELD OF THE INVENTION

The invention relates to the protection of flexible pouch specially designed to contain a biopharmaceutical fluid and more broadly to a system for containing a biopharmaceutical fluid. The invention also relates to methods for manufacturing such a system, for shipping, stacking, filling, draining and detecting a leak in such a system and methods for freezing and thawing the biopharmaceutical fluid within the system. A biopharmaceutical fluid means a biotechnological derived fluid, for example a fluid derived from a culture medium, a cell culture, a buffer solution, an artificial nutrition liquid, a blood fraction, a blood derived component or a pharmaceutical fluid or, more broadly, a fluid specifically designed to be used in the medical field.

BACKGROUND OF THE INVENTION

It is known to use a flexible pouch to contain the biopharmaceutical fluid. The flexible pouch is able to withstand low mechanical stress without damage. Hence, the leakage risk is reduced. Moreover the flexible pouch is advantageous since it can be folded or stored flat when there is no biopharmaceutical fluid inside. Hence, the flexible pouch occupies a small volume.

The flexible pouch is generally designed for a single use and to contain a biopharmaceutical fluid volume which is between 1 liter and 500 liters.

However, specifically for shipping of the flexible pouch filled with fluid, for example, between several plant areas or from the provider of the fluid to its client which will use it, but also for storage, the flexible pouch must be protected, although the leakage risk is small.

The document EP-2 322 442 discloses a container for a flexible pouch. The container comprises a lower part and an upper part which are rigid and joined along a common edge and which form a single piece container. The container has a volume which is much more important than the volume of the flexible pouch. Indeed, the container comprises positioning means for the flexible pouch which is in interior walls of upper and lower parts. This positioning means define a volume for the flexible pouch which is lower than the total volume of the container.

Consequently, the container has a useless volume. Moreover, if the flexible pouch is not retained by the positioning means, it could be moved within the container, especially during shipping. Thus, the leakage risk increases.

SUMMARY OF THE INVENTION

An aim of the invention is to provide protecting means for a flexible pouch which is handier.

For this purpose, the invention provides a protecting body for a flexible pouch specially designed to contain a biopharmaceutical fluid, characterized in that it comprises two substantially planar plates which respectively form a lower surface and an upper surface and which are fixed to each other, the two plates are able to sandwich the flexible pouch for constraining the flexible pouch such that the protecting body is substantially planar, and comprises, on a peripheral side, at least one opening able to receive at least one port of the flexible pouch.

Thus, the two substantially planar plates protect and constrain the shape of the flexible pouch. The protecting body and the flexible pouch occupy a minimum volume. This is particularly advantageous for shipping, but also for storage of the flexible pouch before filling operations.

Moreover, the opening on the peripheral side provides a volume for arranging a port. The port makes it possible to fluidly connect the interior and the exterior of the flexible pouch. Furthermore, since the port is secured, by welding for instance, to the flexible pouch before, the latter is arranged between the two plates, the port occupies the volume provided by the opening. Once the flexible pouch has been sandwiched between the two planar plates, the assembly can be sterilized, for example by means of gamma radiations. In addition, since the two plates constrain the flexible pouch, the draining of the latter is easier. Indeed, the two plates exert a force which tends to expel the biopharmaceutical fluid from the flexible pouch. On the contrary, since the two plates constrain the flexible pouch, to fill the flexible pouch, for example by means of a pump, it is necessary that the pump provides a pressure which is sufficient to overcome the force which tends to expel the biopharmaceutical fluid from the flexible pouch.

According to an embodiment, the two plates are fixed to each other by an attachment system, the attachment system is preferably non-removable.

According to an embodiment, the two plates are flexible enough to allow the protecting body to have a thickness in a central area greater than in a circumferential area, in reference to the plane of the protecting body.

Consequently, when the flexible pouch is filled with the biopharmaceutical fluid, the protective body does not risk breaking. During freezing, using a container such as described in the EP-2 322 442, the lower side wall of the flexible pouch rests on a lower shell support while the upper side wall of the flexible pouch is not in touch with upper shell. Hence, the portion of the biopharmaceutical fluid which is close to the flexible pouch wall which rests on the support freezes more slowly than the other portion. In this case, the frozen biopharmaceutical fluid has, in the portion of the biopharmaceutical fluid which has frozen more slowly, a curved shape (egg-effect). Therefore the freezing may be non-homogeneous, which could be hazardous for protein freezing process. By using the invention for a freezing process, the frozen biopharmaceutical fluid has much more a curved shape. Indeed, since the two plates of protective body constrain the flexible pouch, this "egg-effect" is reduced. Hence, the frozen biopharmaceutical fluid is more homogeneous.

According to an embodiment, the protective body comprises a longitudinal direction, two longitudinal sides and two transversal sides, the attachment system is symmetrically arranged on at least two sides of the two plates, preferably the transversal sides.

Accordingly, the protective body is easy to manufacture. Moreover, the mechanical strains are well-balanced over the parts of the attachment system.

Optionally, the attachment system comprises at least one snap button, one of the two plates comprises a first element of the snap button and the other one of the two plates comprises a second complementary element of the snap button.

The attachment system holds the two plates fixed to each other firmly enough to prevent inadvertent detachment of the two plates during shipping for example.

The snap buttons provides an attachment which is strength enough to firmly attach the two plates to each other.

Optionally, the two plates comprise, on a peripheral side, an assembly for holding a hose connected to the flexible pouch.

The protective body is easier to use since the hose is hold on specifically designed part of the protective body.

According to an embodiment, the assembly for holding a hose is able to hold the hose along at least two sides of the protecting body, preferably a portion of one longitudinal side and one transversal side.

Thus, the protective body can hold a hose which is relatively lengthy.

Optionally, the assembly for holding a hose is able to hold two hoses, the assembly for holding a hose is symmetrically arranged, preferably with respect to the longitudinal direction.

Therefore, flexible pouch is easy to use, for example for filling or draining, even if it is inside the protective body.

According to an embodiment, the assembly for holding a hose connected to the flexible pouch comprises at least one clip which is formed by two complementary bodies respectively carried by each of the two plates.

Optionally, the assembly for holding a hose connected to the flexible pouch comprises at least one cylindrical ring which is formed by two complementary bodies respectively carried by the two plates.

The protective body is reliable and easy to manufacture.

According to an embodiment, the protective body comprises a handle system.

The protective body is handier.

Optionally, the handle system is symmetrically arranged on at least two sides of the two plates, preferably the transversal sides.

According to an embodiment, the two plates each comprise at least one hole such that the protecting body comprises at least one through hole following a direction orthogonal to the plane of the protecting body and which is part of the handle system.

Optionally, the circumference of the through hole has a substantially rectangular shape.

Thus, the protective body is handier and easier to manufacture.

According to an embodiment, wherein the two plates, are made of, one and/or more of copolyester or polyethylene terephthalate.

Optionally, the two plates are identical.

According to an embodiment, the two plates symmetrically face each other.

Optionally, at least one of the two plates is transparent.

According to an embodiment, at least one of the two plates is opaque.

Some biopharmaceutical fluids require to be protected from light whereas some others do not require it. Then, it is possible to select the appropriate plates.

Optionally, at least one of the two plates has an internal surface, in reference to the protecting body, which is rough or corrugated.

Such an internal surface is particularly appropriate to detect a leak within the flexible pouch.

The invention also provides a system for containing a biopharmaceutical fluid comprising:
  a protecting body as above described, and
  a flexible pouch sandwiched between the two plates.

According to an embodiment, the flexible pouch contains a biopharmaceutical fluid.

Optionally, the biopharmaceutical fluid constrains the two plates, such that the protecting body has a thickness in a central area greater than in a circumferential area, in reference to the plane of the protecting body.

According to an embodiment, the two plates constrain the flexible pouch.

Optionally, the system comprises at least one hose comprising at least a portion hold by the assembly for holding a hose.

The invention also provides a method for manufacturing a system for containing a biopharmaceutical fluid, characterized in that it comprises the following steps:
  a flexible pouch is arranged on a substantially planar plate which forms a lower surface,
  a substantially planar plate which forms an upper surface is attached to the plate which forms the lower surface by means of an attachment system, such that the flexible pouch is sandwiched between the two plates which constrain the flexible pouch such that the two plates form a protecting body which is substantially planar, and comprises, on a peripheral side, at least one opening for accessing to the flexible pouch.

The invention also provides a method for filling a system for containing a biopharmaceutical fluid, comprising the following steps:
  the flexible pouch is progressively filled with a biopharmaceutical fluid, the protecting body being substantially planar, and
  the protecting body has a thickness in a central area which is progressively greater than in a circumferential area, in reference to the plane of the protecting body.

The invention also provides a method for draining a system containing a biopharmaceutical fluid, comprising the following steps:
  the flexible pouch is progressively emptied with a biopharmaceutical fluid, and
  the thickness of the protecting body in the central area progressively decreases until the protecting body is substantially planar.

The invention also provides a method for detecting a leak in a system for, characterized in that it comprises the following steps:
  the flexible pouch is sandwiched between two plates which have an internal surface which is rough compared to the flexible pouch,
  a gas is introduced to the flexible pouch, and
  the pressure within the flexible pouch is measured.

For the above mentioned purpose, the invention also provides a protecting package for a flexible pouch specially designed to contain a biopharmaceutical fluid, characterized in that it comprises two frames which respectively form a lower frame and an upper frame and which have a peripheral area, respectively to a main plane of the frames, each frame has an opening on a central area, the two frames are fixed to each other such that they are able to respectively surround two plates which sandwich the flexible pouch.

The protecting package can be associated to the protecting body. The protecting package provides an additional protection to the flexible pouch, particularly around the peripheral area of the latter.

Optionally the two frames are fixed to each other by an attachment system which is preferably removable.

Thus, it is possible to change the protecting package depending on the use of the flexible pouch. For example, a specific protecting package can be used for freezing, thawing or shipping. The protecting package used for freezing could have a high thermal conductivity. However, the protecting package used for shipping could have a high mechanical strength.

According to an embodiment, the attachment system comprises at least one assembly which comprises two complementary bodies such as a screw/nut assembly.

Optionally a longitudinal axis of the screw is perpendicular to the main plane of the frames.

Such an assembly is easy to assemble and disassemble.

According to an embodiment, the protecting package provides a volume to allow the two plates moving, extending, and shrinking in at least one direction belonging to the main plane of the frames.

Optionally the volume allows the two plates moving, extending, and shrinking in two perpendicular directions belonging to the main plane of the frames.

Consequently, the protecting package does not excessively constrain the two plates and the flexible pouch when the latter extends or shrinks, for instance during freezing or thawing of the biopharmaceutical fluid.

According to an embodiment, the volume is delineated by two complementary bodies respectively carried by the two frames.

Thus, the volume is clearly delineated.

Optionally the protecting package comprises an assembly for pinching at least a portion of the two plates.

According to an embodiment, the assembly for pinching at least a portion of the two plates comprises two complementary bodies respectively carried by the two frames.

Hence, the two plates are securely arranged between the two frames when the latters are fixed to each other.

According to an embodiment, the two frames are identical and preferably symmetrically face each other.

The protecting package is consequently easy to manufacture and to assemble.

Optionally at least one of the two frames comprises high-density polyethylene (HDPE) and/or at least one of the two frames comprises polyethylene terephthalate (PET).

The PET frame is suitable for shipping and the HDPE frame is suitable for freezing.

The invention also provides a system for containing a biopharmaceutical fluid comprising:
  a protecting body for a flexible pouch specially designed to contain a biopharmaceutical fluid which comprises two substantially planar plates which respectively form a lower surface and an upper surface and which are fixed to each other, the two plates are able to sandwich the flexible pouch for constraining the flexible pouch such that the protecting body is substantially planar, and comprises, on a peripheral side, at least one opening able to receive at least one port of the flexible pouch,
  a protecting package as previously described, wherein the two frames respectively surround the two plates.

More generally, it is possible to associate a protecting body as described in the specification and one protecting package as described in the specification.

Optionally the system comprises a flexible pouch sandwiched between the two plates.

According to an embodiment, the flexible pouch comprises biopharmaceutical fluid.

The invention also provides a method for manufacturing a system for containing a biopharmaceutical fluid, characterized in that it comprises the following steps:
  a flexible pouch is arranged on a substantially planar plate which forms a lower surface,
  a substantially planar plate which forms an upper surface is attached to the plate which forms the lower surface by means of an attachment system, such that the flexible pouch is sandwiched between the two plates which constrain the flexible pouch such that the two plates form a protecting body which is substantially planar, and comprises, on a peripheral side, at least one opening for accessing to the flexible pouch,
  two frames, which respectively form a lower frame and an upper frame and which have a peripheral area, respectively to a main plane of the frames, and having an opening on a central area, are fixed to each other such that they surround the flexible pouch, the upper frame surrounds the plate which forms the upper surface and the lower frame surrounds the plate which forms the lower surface.

Lastly, the invention provides a leak test for a flexible pouch specifically designed to contain a biopharmaceutical fluid characterized in that it comprises the following steps:
  the flexible pouch is sandwiched between two plates which have an internal surface able to allow gas which escape from a hole on the flexible pouch flowing out of an external surface of the flexible pouch,
  a gas is introduced within the flexible pouch, and
  the pressure within the flexible pouch is measured.

Optionally, two frames are fixed to each other such that they surround the two plates.

Thus, the leak test can be performed with any of the two systems above mentioned if the two plates have an internal surface able to allow gas which escape from a hole on the flexible pouch flowing out of an external surface of the flexible pouch. Thus, any of the two above mentioned systems can be easily leak tested.

According to an embodiment, after the gas has been introduced within the flexible pouch, a pressure change is measured in the flexible pouch during a predetermined duration.

Optionally, an expansion of the flexible pouch and the two plates is limited by two compressing bodies, in a direction perpendicular to a main plane of the two plates.

According to an embodiment, a dimension, in the direction perpendicular to the main plane of the two plates, between two respective internal surfaces of the two compressing bodies is between 5 millimeters and 15 millimeters.

These features allow defining a criterion for considering a flexible pouch as being defective or not.

Optionally, the two compressing bodies are respectively in touch with a portion of the part of the two plates which is in touch with the external surfaces of the flexible pouch.

According to an embodiment, the portion is 70% or 80% or 90% or 100%.

These features allow adjusting the above mentioned criterion.

Optionally, at least one of the two plates has an internal surface which is rough or corrugated.

According to an embodiment, at least one of the two plates has an internal surface which comprises a fumed silica coating.

Optionally, at least one of the two plates has an internal surface which is porous.

According to an embodiment, at least one of the two plates has an internal surface which comprises a porous fleece material.

These features avoid that the external layers of the pouch stick to the internal layers of the plate, and therefore allow a gas to escaping from a hole on the flexible pouch flowing out of an external surface of the flexible pouch.

BRIEF DESCRIPTION OF THE DRAWINGS

The accompanying drawings illustrate an embodiment of the invention and, together with a general description of the invention given above, and the detailed description of the embodiments given below, serve to explain the principles of the invention.

DETAILED DESCRIPTION OF THE INVENTION

Protecting Body

Figure 1:
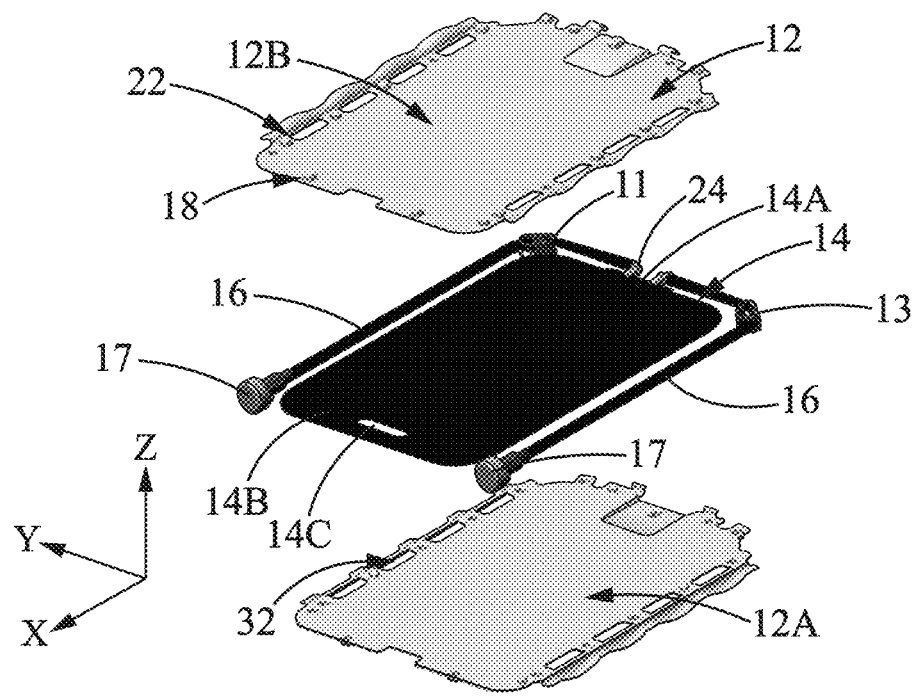
FIG. 1 shows a perspective view of a first system for containing a biopharmaceutical fluid according to an embodiment of the invention which is disassembled.
Figure 2:
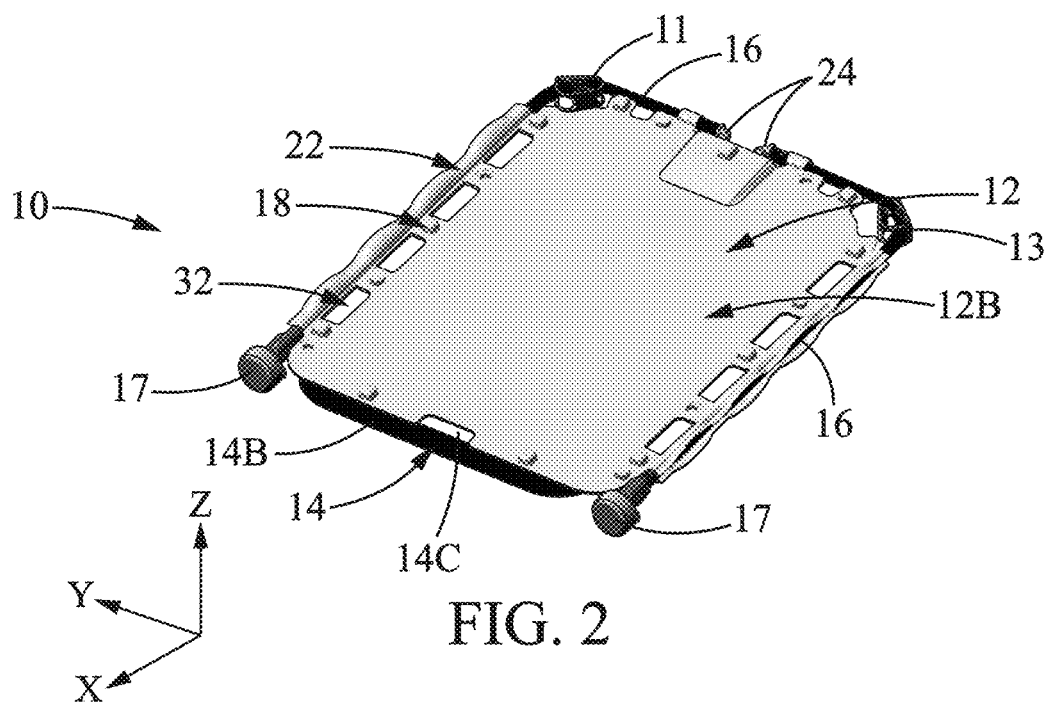
FIG. 2 shows the first system assembled, in a perspective view.

FIGS. 1 and 2 show a first system 10 for containing a biopharmaceutical fluid according to the invention.

The first system 10 comprises a protecting body 12, a flexible pouch 14 and two hoses 16 connected to the flexible pouch 14. The protecting body 12 and the flexible pouch 14 comprise a longitudinal direction (X) and a transversal direction (Y). The protecting body 12 and the flexible pouch 14 comprise longitudinal and transversal sides.

The flexible pouch 14 is substantially planar, has a substantially rectangular shape, and extends in a main plane (XY) which is here the horizontal plane. The flexible pouch 14 is specifically designed to be able to contain up to 100 liters of the biopharmaceutical fluid. The two hoses 16 are connected to a front longitudinal edge 14A of the flexible pouch 14. An opposite longitudinal edge of the flexible pouch 14 to the front longitudinal edge 14A is a rear longitudinal edge 14B.

As one can see on FIG. 1, the flexible pouch 14 comprises a through hole 14C which can form a handle for the flexible pouch 14. But, mainly, the through hole 14C makes it possible to attach two other protecting bodies to each other such that each protecting body covers the external surface of one of the two plates 12A, 12B. Indeed, the through hole 14C provides a free space wherein an attachment means, such as a screw, can be arranged to attach the protecting bodies one to each other. Hence, the first system 10 is reinforced which is especially relevant regarding shipping for example.

The protecting body 12 comprises two substantially planar plates 12A, 12B. The planar plates 12A, 12B extend also in a plane parallel to the main plane (XY). The plate 12A forms a lower surface and the plate 12B forms an upper surface, with respect to a vertical axis (Z).

The two hoses 16 are connected to the flexible pouch 14 on the front longitudinal side of the protecting body 12, each extends along one transversal side of the protecting body 12, and each comprises a connector 17. The connectors 17 make it possible to fluidly connect the flexible pouch 14 to another element, for example a tank. The longitudinal rear side of the protecting body extends between the two connectors 17.

As can be seen on FIG. 2, when the two plates 12A, 12B are fixed to each other, they sandwich the flexible pouch 14. The planar plate 12A, which forms the lower surface of the protective body 12, presses the lower surface, with respect to the vertical axis (Z), of the flexible pouch 14. Similarly, the planar plate 12B, which forms the upper surface of the protective body 12, presses the upper surface, with respect to the vertical axis (Z), of the flexible pouch 14. The two plates 12A have planar dimensions which are substantially identical to the ones of the flexible pouch 14.

As illustrated on FIGS. 1 and 2, the first system 10 comprises two clamps 11, 13. Each clamp 11, 13 is located near to one corner between the front longitudinal edge 14A of the flexible pouch and one transversal edge. Each clamp 11, 13 respectively pinches one hose 16 at a straight angle. Thus, each plate 12A, 12B comprises a cut-out located at each corner between its front longitudinal edge and one transversal edge. These cut-outs create a free space that can be occupied by the clamps 11, 13.

Thus, each of the two plates 12A, 12B has a substantially rectangular shape with two cut-outs respectively on one corner.

As shown on FIG. 2, the rear longitudinal edge 14B and a portion of the through hole 14C are not sandwiched by the two plates 12A, 12B. This part of the flexible pouch 14 is flat and does not comprise biopharmaceutical fluid. Indeed, the rear longitudinal edge 14B comprises two films which are welded one to each other. Hence, the biopharmaceutical fluid is in a part of the flexible pouch 14 which is protected by the two plates 12A, 12B.

The two plates 12A, 12B are more rigid than the flexible pouch 14. Consequently, when the two plates 12A, 12B sandwich the flexible pouch 14, they constrain the flexible pouch 14. Thus, the protective body 12 and the flexible pouch 12 are substantially planar.

Figure 6:
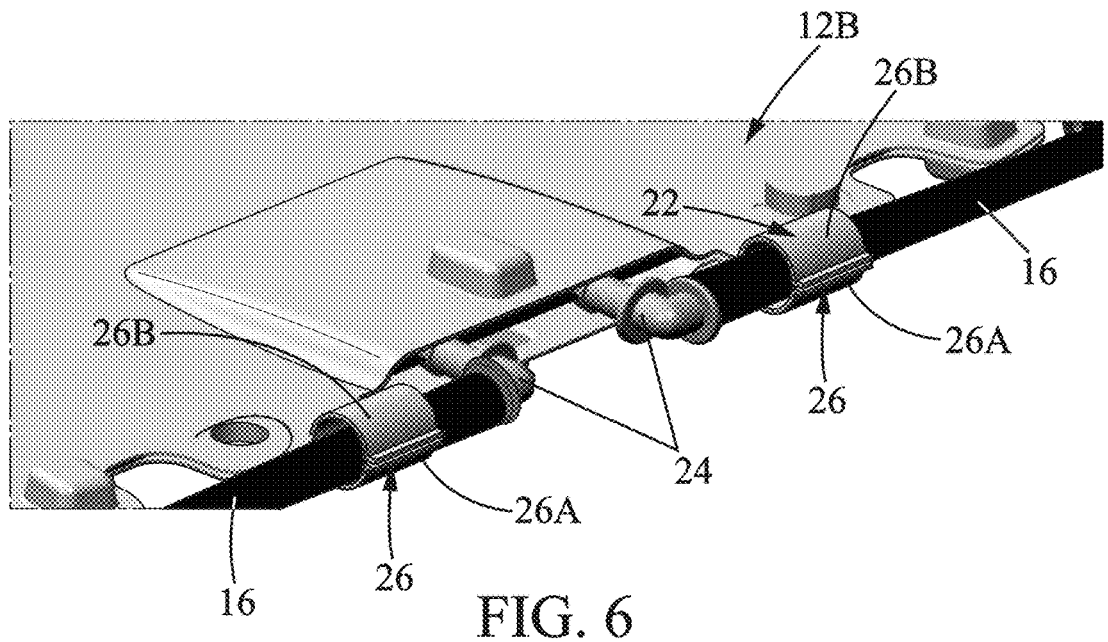

As illustrated on FIG. 6, the two plates 12A, 12B sandwich the flexible pouch 14 with respect to the main plane (XY), but the protective body 12 comprises, on a peripheral side, at least one opening for accessing to the flexible pouch 14. More broadly, the protective body 12 comprises at least one opening on the peripheral side. As one can see on FIG. 6, the opening is able to receive at least one port 24 mounted to one hose 16 to fluidly connect the interior and the exterior of the flexible pouch 14.

Figure 3:
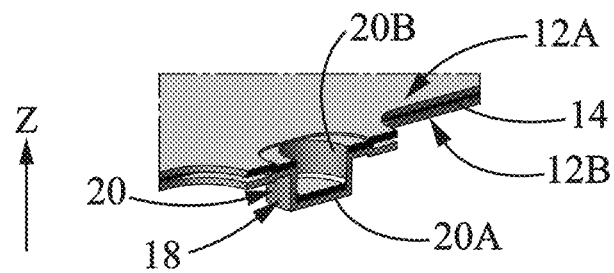
FIG. 3 shows a sectional view of a part of FIG. 2, FIGS. 4 to 7 show perspective views of parts of FIG. 2.

The two plates 12A, 12B are identical and symmetrically face each other, with respect to the main plane (XY). Moreover, they are removably fixed to each other by an attachment system 18 that can be specifically seen on FIGS. 1 to 3. In this embodiment, the attachment system 18 is a non-removable attachment system 18. This means that once the two plates 12A, 12B are fixed to each other, it is not possible anymore to detach the two plates 12A, 12B one from each other.

The attachment system 18 comprises a plurality of snap buttons 20. As can be seen on FIGS. 1 and 3, one of the two plates 12A, 12B comprises a first element 20A of one snap button 20 and the other one of the two plates 12A, 12B comprises a second complementary element 20B of one snap button 20. As illustrated on FIG. 3, the second element 20B engages the first element 20A in a direction parallel to the vertical axis (Z).

In this embodiment, the protecting body 12 comprises snap buttons 20 on transversal and longitudinal sides. As one can see on FIG. 2, the snap buttons 20 are symmetrically arranged on the transversal sides of the two plates 12A, 12B. Indeed, the protecting body 12 comprises four snap buttons 20 on each transversal side. However, the protecting body 12 comprises more snap buttons 20 on the front longitudinal side 14A than in the rear longitudinal side 14B.

Furthermore, the protecting body 12 comprises an assembly 22 for holding the two hoses 16 which is specifically illustrated on FIGS. 4 to 7. The two plates 12A, 12B, comprise, on their peripheral sides, complementary parts which form the assembly 22 for holding the two hoses 16.

Figure 7:
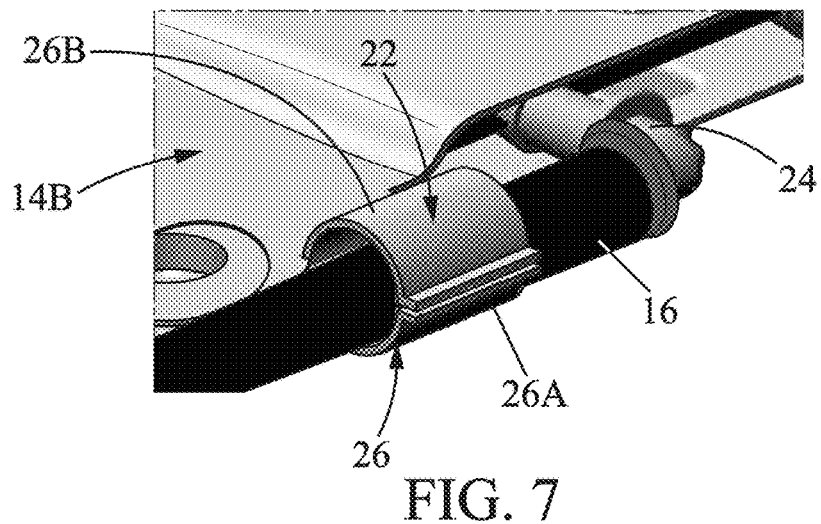

As shown on FIGS. 6 and 7, each one of the two hoses 16 is connected to the front longitudinal side 14A of the flexible pouch 14 by means of a port 24. For example, one port forms an inlet for the flexible pouch 14 and the other one forms an outlet of the flexible pouch 14. As can be seen on FIG. 1, the assembly 22 for holding the two hoses 16 is symmetrically arranged with respect to the longitudinal direction (X). Each symmetrical part is able to hold one hose 16. Thus, right now, only one symmetrical part will be described. Referring back to FIGS. 6 and 7, the assembly 22 for holding one hose 16 comprises, on the longitudinal front side of the protective body 12, in the vicinity of the port 24, a cylindrical ring 26 which is formed by two complementary bodies 26A, 26B, respectively carried by the two plates 12A, 12B. The cylindrical ring 26 has a diameter which is greater than the one of the hose 16. The cylindrical ring 26 is able to prevent the hose 16 to fold in the vicinity of the connector 24. Thus, the leak and kinking risks is decreased.

Figure 4:
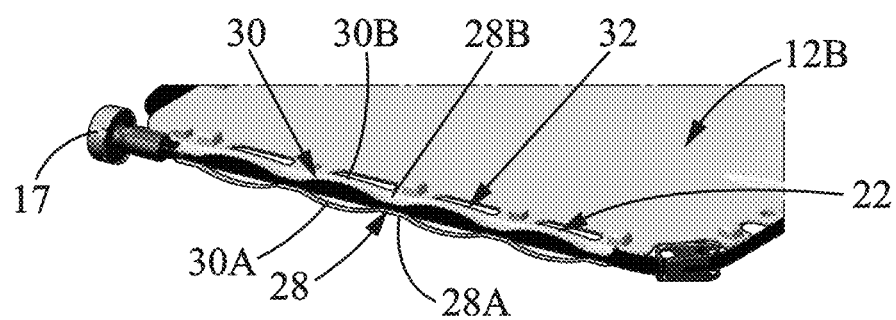
Figure 5:
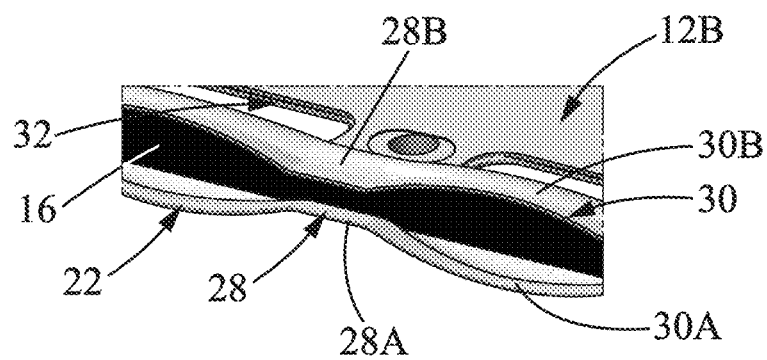

As shown in FIGS. 4 and 5, the assembly 22 for holding the hose 16 comprises a plurality of clips 28 which are formed by two complementary bodies 28A, 28B respectively carried by each of the two plates 12A, 12B. Each clip 28 is able to softly pinch the hose 16 in order to retain it. The plurality of clips is arranged along one longitudinal side of the protecting body 12. Between two clips 28, the assembly for holding the hose 16 comprises a sheath 30 which is also formed by two complementary bodies 30A, 30B respectively carried by each of the two plates 12A, 12B. Thus, the clips 28 and the sheaths 30 form a single piece. The sheaths 30 protect the hose 16 without constraining it.

Thus, each hose 16 is hold by the assembly 22 for holding the hose 16 along the front longitudinal side 14A and one transversal side of the flexible pouch 14.

The protecting body 12 also comprises a handle system 32 to allow a user to carry easily the first system 10 for containing a biopharmaceutical fluid.

As depicted on FIG. 2, the handle system 32 is symmetrically arranged with respect to the longitudinal direction (X) on the two transversal sides. As illustrated on FIGS. 1 and 2, the two plates 12A, 12B, comprise, on their longitudinal sides, a plurality of through holes, whose the circumferences have a substantially rectangular shape, following the vertical direction (Z). The circumferences of these through holes face each other such that, when the two plates 12A, 12B are fixed to each other, the protecting body 12 comprises a plurality of through holes following the vertical direction (Z). Each of these through holes are part of the handle system 32.

Figure 8:
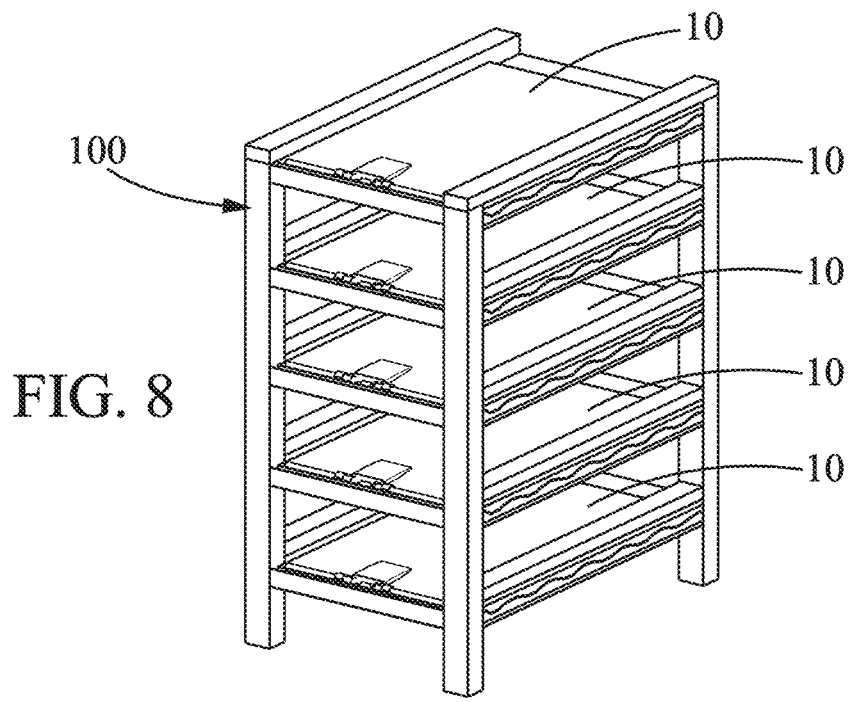
FIG. 8 shows several assembled systems stored on a shelf.

The two plates 12A, 12B are rigid enough to constrain the shape of the flexible pouch 14 such that the first system 10 for containing the biopharmaceutical fluid occupies a minimum volume. This is particularly advantageous for storage or shipping. For example, on FIG. 8, a device 100 to hold a plurality of systems 10 for containing a biopharmaceutical fluid is shown. The device holds five systems 10 stored on a shelf. Thus, the flexible pouches 14 can be frozen, thawed, filled or emptied simultaneously when they are stored on the device 100. When the flexible pouches 14 are stored, the biopharmaceutical fluid can be frozen or thawed. When the flexible pouches are shipped, most often, the biopharmaceutical fluid is thawed even if the biopharmaceutical fluid can as well be frozen.

However, the two plates 12A, 12B are also flexible enough to allow the protective body 12 to have a thickness in a central area greater than in a circumferential area. The latter comprises the longitudinal and transversal sides. Thus, when the biopharmaceutical fluid is frozen, the central area of the flexible pouch is slightly curved. Hence, a dimension on the longitudinal direction (X) of the protecting body 12 slightly decreases. In this case, the biopharmaceutical fluid slightly constrains the two plates 12A, 12B.

Protecting Package

A second system 110 for containing the biopharmaceutical fluid will now be described in reference to FIGS. 10 to 15.

The second system 110 comprises a first system 10 as above described. The first system 10 comprises the two plates 12A, 12B and the flexible pouch 14, comprising the biopharmaceutical fluid, sandwiched between the two plates 12A, 12B. Moreover, the second system 110 also comprises a protecting package 112. The protecting package 112 comprises two frames 112A, 112B. As illustrated on among others FIGS. 10 and 11, the two frames 112A, 112B are identical and symmetrically face each other.

The frame 112A forms a lower frame and the frame 112B forms an upper frame with respect to a vertical axis (Z). Each frame 112A, 112B has a main plane (XY) which is also the main plane of the protecting body 12. The two frames 112A, 112B have a longitudinal direction (X) and a transversal direction (Y) which are the same as the ones of the protecting body 12. The two frames 112A, 112B also have a longitudinal front side 113A and a longitudinal rear side 113B and two transversal sides which link the longitudinal front side 113A and the longitudinal rear side 113B.

Figure 10:
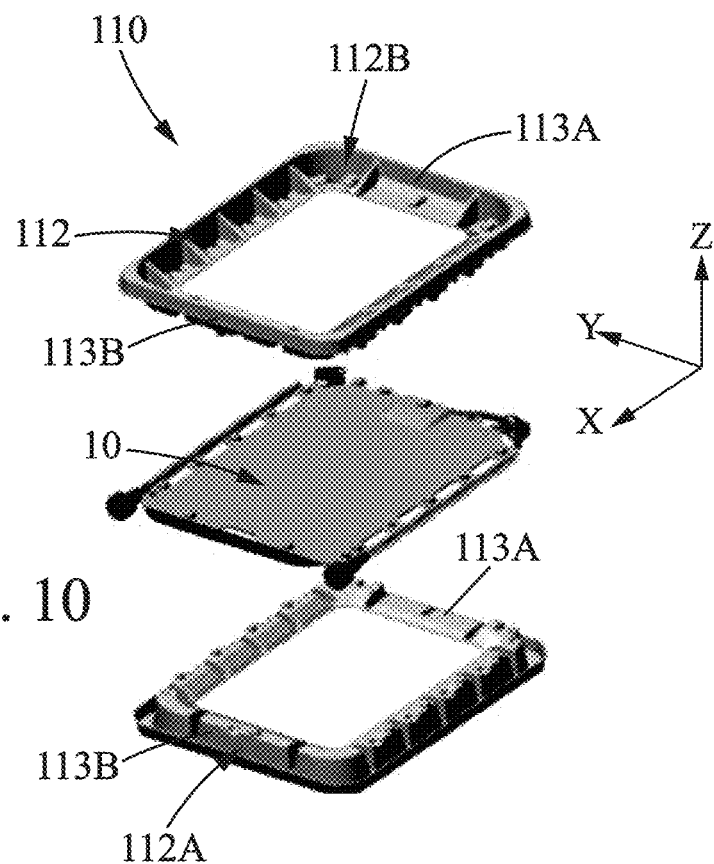
FIG. 10 shows a perspective disassembled view of a second system for containing a biopharmaceutical fluid which comprises a protecting body and a protecting package according to the invention.
Figure 11:
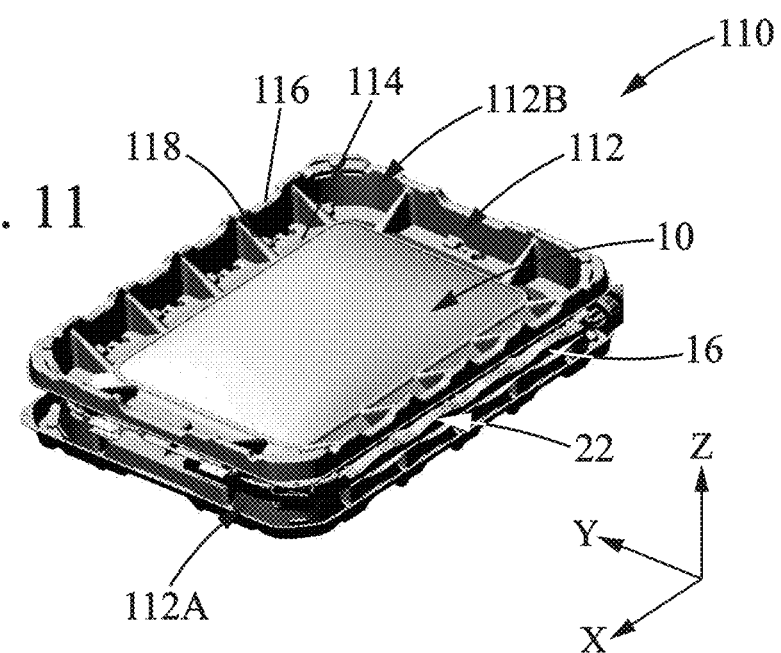
FIG. 11 shows a perspective view of the second system assembled.

The two frames 112A, 112B have a peripheral area as shown on FIGS. 10 and 11, with respect to the main plane (XY). The peripheral area of each frame 112A, 112B delineates an opening on a central area.

Moreover, each frame 112A, 112B have a peripheral inner edge 114 and a peripheral outer edge 116, with respect to the opening. The peripheral inner 114 and outer 116 edges do not belong to a same plane parallel to the main plane (XY). Between these peripheral inner 114 and outer 116 edges, each frame 112A, 112B comprises a plurality of structural reinforcement bodies 118 which link the two edges and which are regularly arranged on longitudinal and transversal sides of an external surface, with respect to the flexible pouch 14, of each frame 112A, 112B. These structural reinforcement bodies 118 can be seen on the frame 112B on FIG. 11. As illustrated on FIG. 11, the inner peripheral edge 114 of each frame 112A, 112B is regular whereas the outer peripheral edge 116 of each frame 112A, 112B is corrugated. This increases the mechanical resilience of the two frames 112A, 112B when the two frames 112A, 112B are fixed to each other.

The two frames 112A, 112B are fixed to each other such that they respectively surround the two plates 12A, 12B which sandwich the flexible pouch 14 as can be seen on FIG. 11. The upper frame 112B surrounds the plate 12B which forms the upper surface of the protecting body 12 and the lower frame 12A surrounds the plate 112A which forms the upper surface of the protecting body 12. Since the two frames 112A, 112B have a central opening, they surround the peripheral area of the two plates 12A, 12B and not the central area of these two plates 12A, 12B. Hence, the two frames 112A, 112B essentially protect the peripheral area of the system 10 comprising and the protecting body 12 and the flexible pouch 14. As can be seen on FIG. 11, they cover the assembly 22 for holding the two hoses 16 which are protected.

Figure 14:
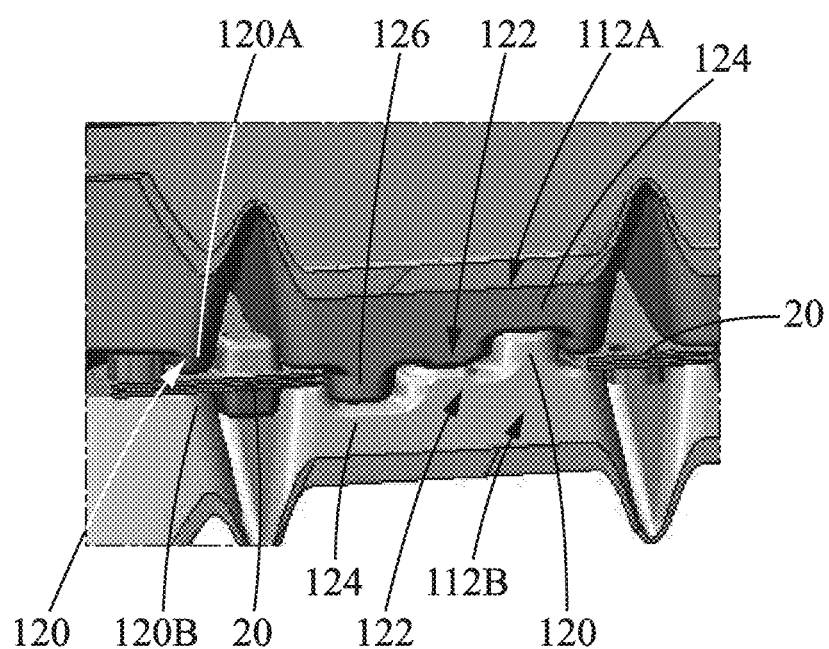

As illustrated on FIG. 14, the protecting package 112 comprises at least an assembly 120 for pinching at least a portion of the two plates 12A, 12B. The assembly 12 comprises two complementary bodies 120A, 120B respectively carried by the two frames 120A, 120B. When the two frames are fixed to each other, as illustrated on FIG. 14, they are close enough to pinch a portion of the protecting body 12.

Figure 12:
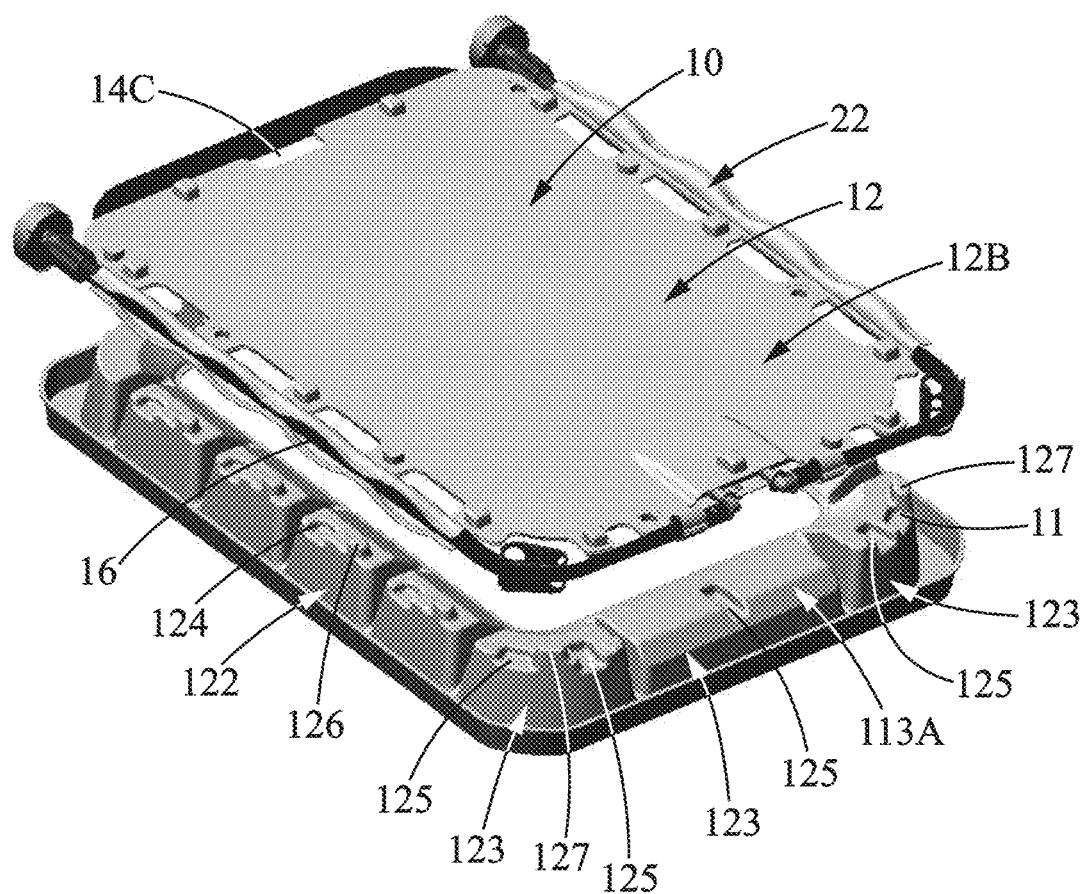
FIG. 12 shows a perspective view of one frame, a protecting body and a flexible pouch.
Figure 13:
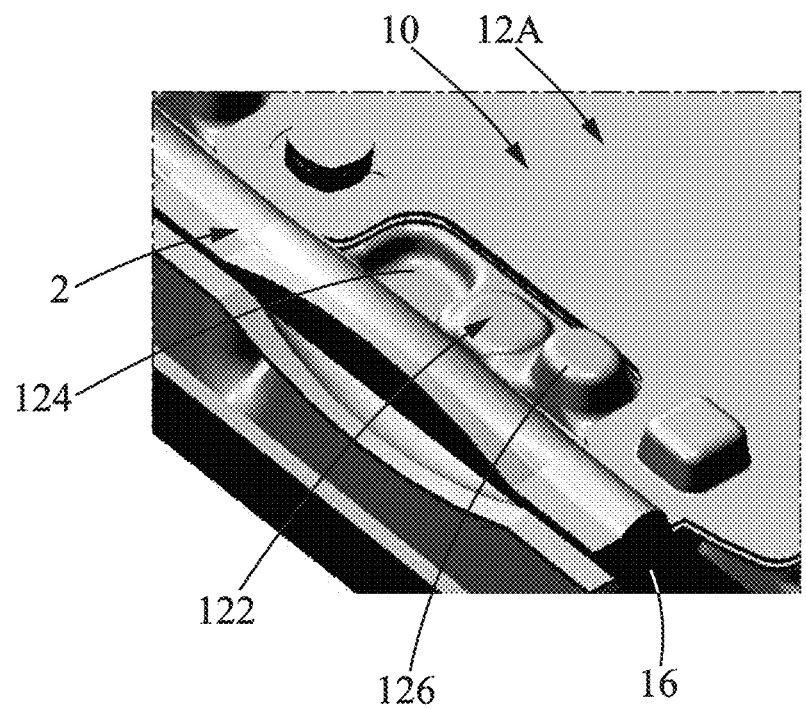
FIGS. 13 and 14 shows perspective views of parts of the second system assembled.

Furthermore, as shown on FIGS. 12 and 13 together, the internal surface, with respect to the flexible pouch 14, of each frame 112A, 112B comprises a plurality of bodies 122 regularly arranged along the transversal sides of the two frames 112A, 112B. As particularly shown on FIG. 13, these regular bodies 122 are complementary to the assembly 22 for holding the hoses 16 and the through holes which form the handle system 32. Hence, when the protecting body 12 is surrounded by the two frames 112A, 112B, there is no free space between the assembly 22 for holding the hoses 16 and the other part of the plates 12A, 12B.

Moreover, as can be seen on FIG. 12, each body 122 of the lower frame 112A comprises a recess 124 and a protrusion 126 on an upper surface, with respect to the vertical axis (Z). These recesses 124 and protrusions 126 are complementary to the ones carried by identical bodies of the upper frame 112B. These assemblies allow the two frames 112A, 112B being positioned one to each other.

The longitudinal front side 113A and longitudinal rear side 113B comprise also a plurality of bodies 123, as can be seen on FIG. 12. These bodies 123 also have recesses 125, 125A and protrusions 127, with respect to the vertical axis (Z). The recesses 125 and protrusions 127 have the same function as above depicted. The recesses 125A provide a space where the snap buttons 20 of the two plates 12A, 12B can move as explained below.

Further, the two frames 112A, 112B are fixed to each other by an attachment system which is in this embodiment non removable. The attachment system is not in one piece with the two frames 112A, 112B. Indeed, preferably, the attachment system comprises at least one assembly comprising two complementary bodies. These complementary bodies can respectively be a male component and a female component. Preferably, the attachment system comprises a plurality of male and female components which are regularly arranged around the peripheral sides of the two frames 112A, 112B.

For instance, the assembly can comprise a snap assembly in two pieces. One piece is the male component and the other one is the female component. This assembly is advantageous since the two frames 112A, 112B can be fixed to each other by pressing the male component into the female component. Similarly, the assembly can also comprise a two pieces clip assembly wherein for instance one component is rotated with respect to the other one to lock the two frames 112A, 112B fixed to each other. The assembly can comprise a two pieces assembly wherein the male component comprises a protrusion which is complementary to a recess of the female component.

More generally, in the two pieces assembly above described, one of the male components can be arranged on the free space provided by the through hole 14C of the protecting body 12 as above described. Thus, the longitudinal axis of the male component is perpendicular to the main plane (XY) of the two frames 112A, 112B.

Figure 16:
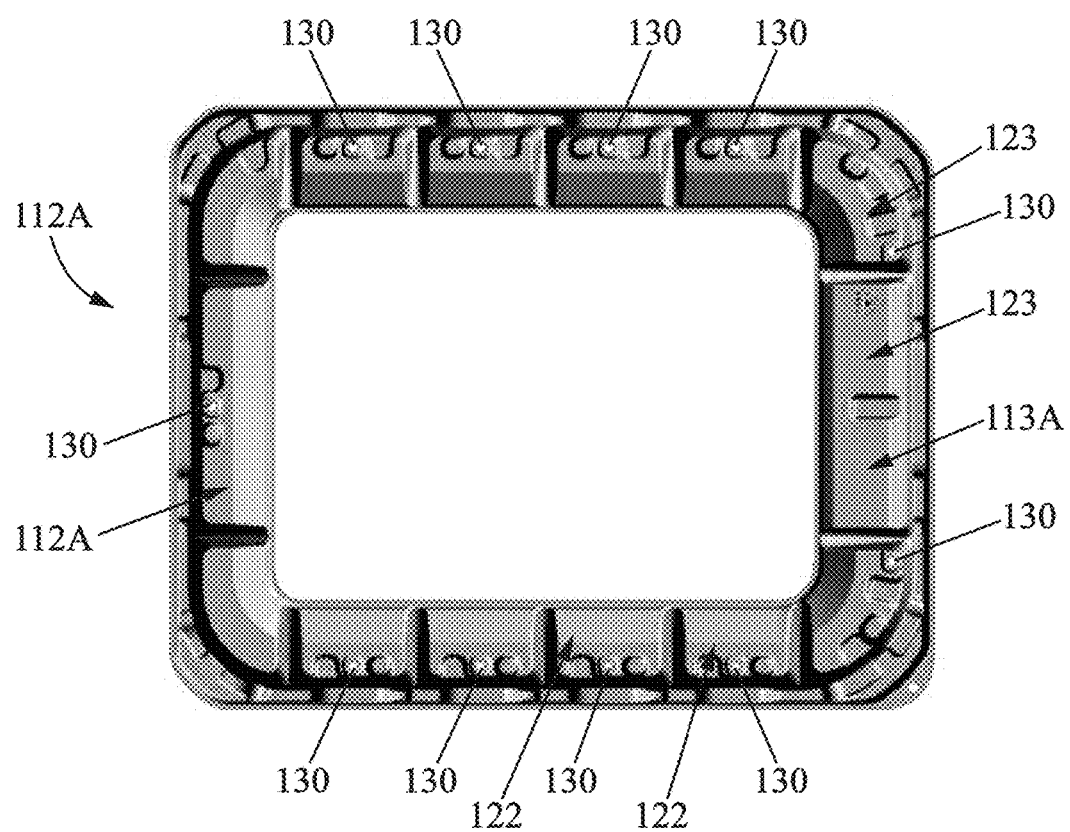
FIG. 16 shows a view from above of a lower frame of the second system.

If the attachment system comprises a plurality of male and female components regularly arranged around the peripheral sides of the two frames 112A, 112B, the bodies 123, 122 can comprise through holes 130 to receive the male components as one can see on FIG. 16.

The assembly can also comprise only one piece. For example, the two frames 112A, 112B can be fixed to each other by at least one rivet or preferably a plurality of rivets. One of the rivet can be arranged on the free space provided by the through hole 14C of the protecting body 12 as above described. Thus, the longitudinal axis of the rivet is perpendicular to the main plane (XY) of the two frames 112A, 112B. The rivets can also be arranged on the through holes 130.

Optionally, the attachment system can be removable and comprises for instance at least one assembly comprising two complementary bodies such as a screw/nut assembly. However, the nut can also be in one piece with one the two frames 112A, 112B, preferably the lower frame 112A. The screw can be arranged on the free space provided by the through hole 14C of the protecting body 12 as above described. Thus, the longitudinal axis of the screw is perpendicular to the main plane (XY) of the two frames 112A, 112B. Once more, the attachment system can comprise a plurality of screw/nut assemblies wherein the screws are arranged on the through holes 130.

Moreover, as depicted on FIG. 14, when the two frames 112A, 112B are fixed to each other, the protecting package 112 provides a free volume between two successive couple of bodies 122 and between the bodies 123 as illustrated on FIG. 12. This volume allows the two plates 12A, 12B and more precisely the snap buttons 20 of the two plates 12A, 12B moving. Indeed, when the flexible pouch 14 is filled with biopharmaceutical fluid, its dimension in the vertical axis (Z) increases. Hence, the two plates 12A, 12B curve under the pressure of the flexible pouch 14. Hence, the two plates 12A, 12B shrink in at least one direction of plane (XY). In this case, the snap buttons 20 of the protecting body 12 have to move. When the flexible pouch 14 is drained, the two plates 12A, 12B extend and the snap buttons 20 move to follow this extension. The recesses 125A carried by the two bodies 123 have the same function.

Figure 15:
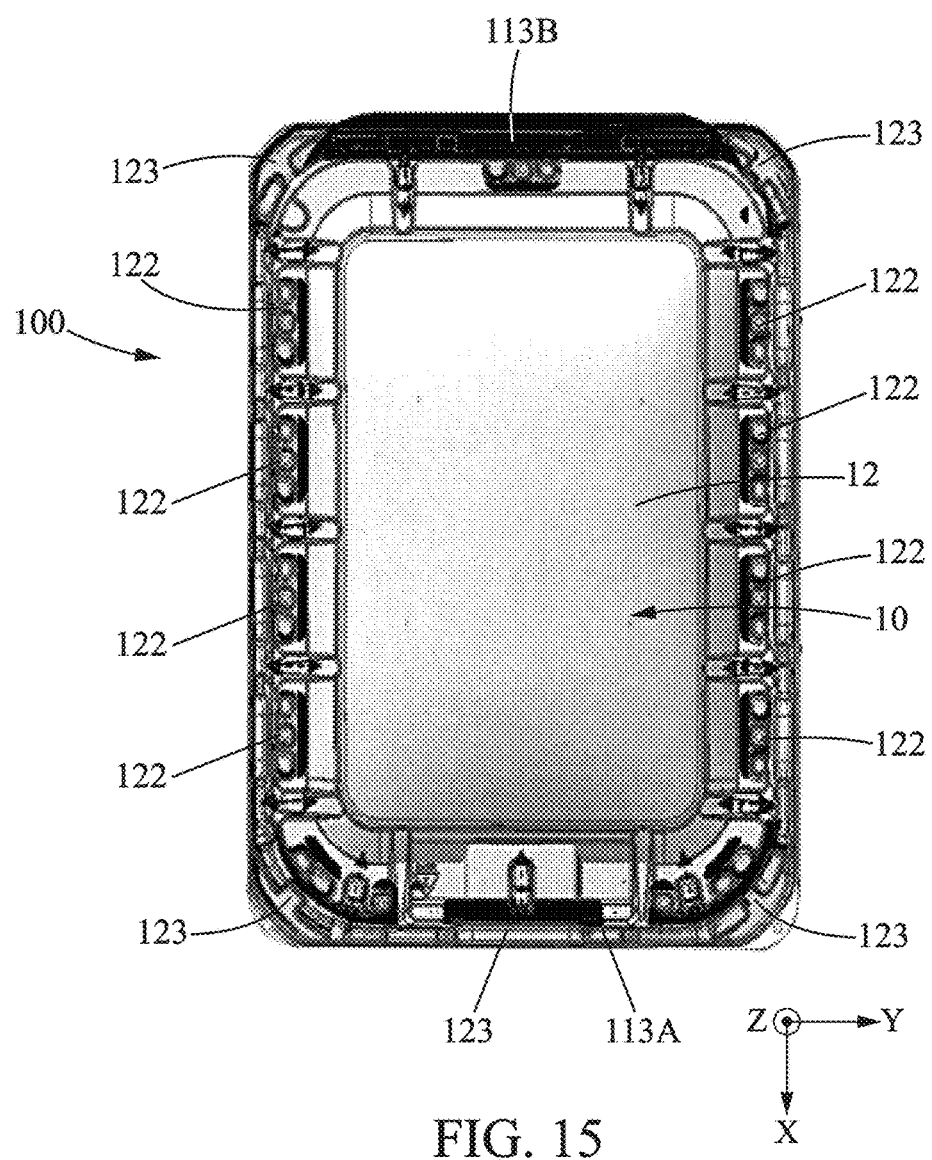
FIG. 15 shows a view from above of the second system.

Moreover, as illustrated on FIG. 15, the protecting package 112 comprises a plurality of free volumes on the four sides of the protecting package 112. The arrows show the range of motion the snap buttons 20 of two plates 12A, 12B can have. Thus, the two plates 12A, 12B can extend and shrink in two directions, respectively longitudinal (X) and transversal (Y) directions, of the main plane (XY). Optionally, the protecting package only comprises free volumes to allow the snap buttons 20 of the two plates 12A, 12B moving in one direction of the main plane (XY).

Hence, these volumes are delineated by two complementary bodies 122 or 123 respectively carried by the two frames 112A, 112B.

Figure 17:
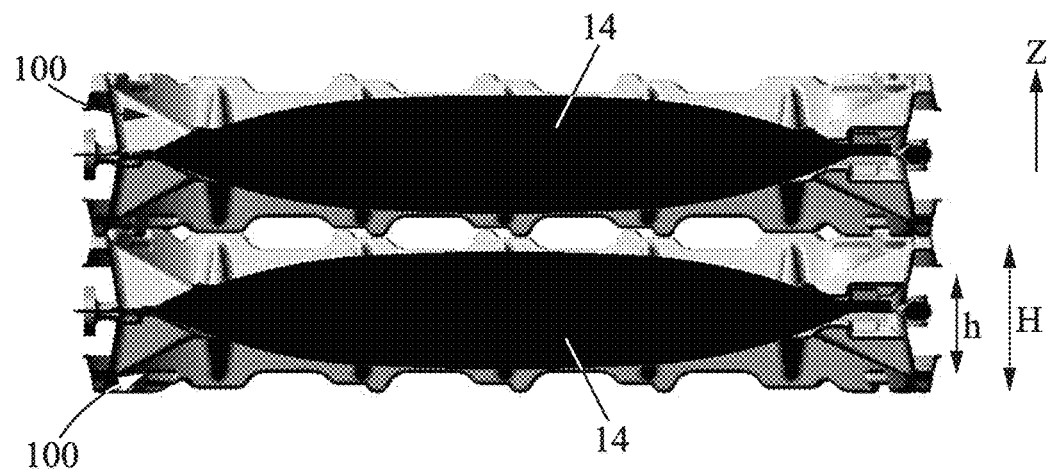
FIG. 17 is a sectional view of two second systems stacked one on each other.

Furthermore, several systems 100 can be stacked one on each other even if the flexible pouch 14 is filled with biopharmaceutical fluid. Indeed, as one can see on FIG. 17, the maximum dimension h, following the vertical axis (Z), of the system 10 which comprises the flexible pouch 14 and the two plates 12A, 12B, is less than the dimension H, following the vertical axis (Z), between the two outer edges 116 of respectively the two frames 112A, 112B.

In this embodiment, the two frames 112A, 112B comprise high-density polyethylene (HDPE). So, these frames 112A, 112B are particularly suitable for freezing of the biopharmaceutical fluid. The two frames 112A, 112B, could also comprise polyethylene terephthalate (PET) and be particularly suitable for shipping of the biopharmaceutical fluid.

Method of Manufacturing, Filling and Draining

A method for manufacturing the first system 10 for containing a biopharmaceutical fluid will now be described in reference to FIGS. 1 and 2.

Firstly, the flexible pouch 14 is arranged on the substantially planar plate 12A which forms the lower surface of the protective body 12.

Then, the substantially planar plate 12B, which forms an upper surface of the protecting body 12, is attached to the plate 12A by means of the attachment system 18. The flexible pouch 14 is consequently sandwiched between the two plates 12A, 12B as illustrated on FIG. 2. In this situation, the two plates form the protecting body 12 and constrain the flexible pouch 14. The protecting body 12 is substantially planar and has a thickness which is substantially the same on the peripheral area and on the central area.

Then, the system 10 is sterilized, preferably by means of gamma radiations. Alternatively, the two plates 12A, 12B and the flexible pouch 14 are sterilized separately before the system 10 is assembled.

The system 10 is manufactured.

A method for manufacturing the second system 100 comprises the above mentioned steps except the step about sterilization.

Then, the two frames 112A, 112B are arranged around the two plates 12A, 12B. The two frames 112A, 112B are fixed to each other such that they surround the two plates 12A, 12B and consequently the flexible pouch 14. Thus, the upper frame 112A surrounds the plate 12A which forms the upper surface and the lower frame 112B surrounds the plate 12B which forms the lower surface.

Once the second system 100 is manufactured, it is sterilized preferably by means of gamma radiations.

After the first system 10 or the second system 100 for containing the biopharmaceutical fluid is manufactured, the flexible pouch 14 is progressively filled with the biopharmaceutical fluid. Thus, the protecting body 12 has a thickness in the central area which becomes progressively greater than in the circumferential area, in reference to the main plane (XY). Then, if the biopharmaceutical fluid is frozen, as described above, the thickness, in the central area of the protecting body 12, is still progressively greater than in a circumferential area, in reference to the main plane (XY).

Similarly, to drain the first system 10 or the second system 100 containing the biopharmaceutical fluid, the flexible pouch 14 is progressively emptied with the biopharmaceutical fluid. the thickness of the protecting body 12 in the central area progressively decreases until the protecting body is substantially planar.

If the biopharmaceutical fluid is frozen, before draining, it is thawed. Thus, progressively, the thickness of the protecting body 12 in the central area also progressively decreases until the protecting body 12 is substantially planar.

Leak Test Methods

Figure 9:
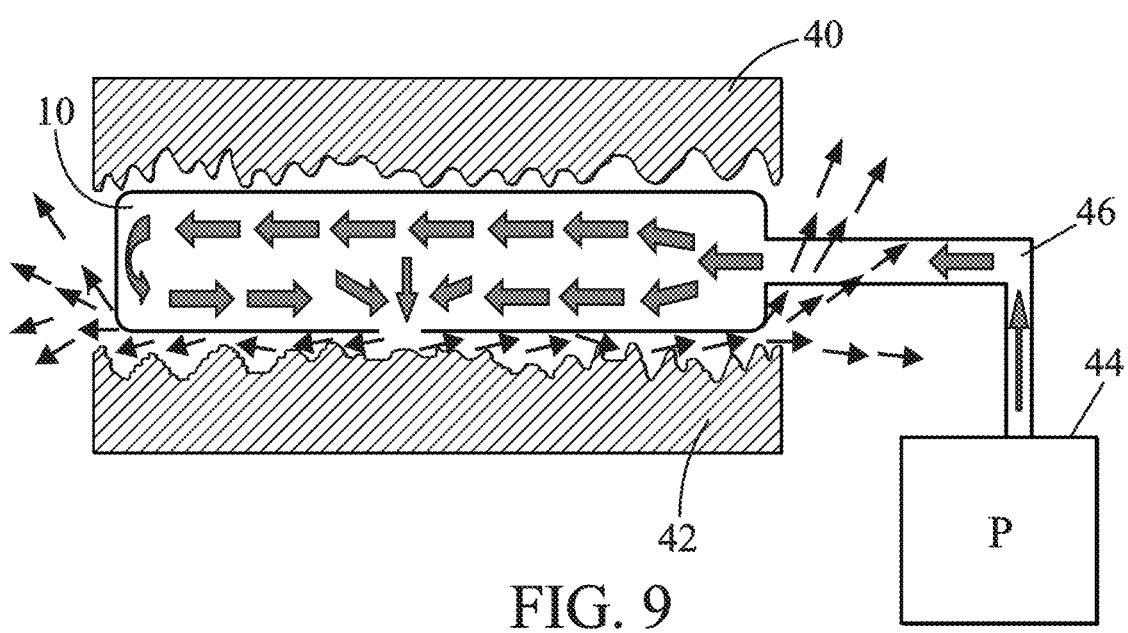
FIG. 9 shows a schematic view of the system during a leak test.

With respect to FIG. 9, a method for detecting a leak in the flexible pouch 14 will be now described.

As shown schematically, the flexible pouch 14 is sandwiched between two plates 40, 42, which have an internal surface which is corrugated. Thus, external surfaces of the flexible pouch 14 are in touch with the corrugated internal surfaces of the two plates 40, 42.

Then, as illustrated by the arrows, a gas is introduced into the flexible pouch 14 by means of a pump 44 linked to an inlet of the flexible pouch 14 by means of a hose 46.

Then, after the gas has been introduced within the flexible pouch 14 such that the flexible pouch 14 is pressurized at a pressure value, the inlet of the flexible pouch 14 is closed. The pressure within the flexible pouch 14 is measured. Since, the internal surfaces of the two plates 40, 42 are rough, if there is a leak caused by a through hole on the flexible pouch 14, the gas can escape from the flexible pouch 14 and flow out of the external surface of the flexible pouch 14.

Thus, a pressure drop is measured. An operator can define a pressure drop threshold. If the measured drop pressure is above this threshold, the flexible pouch is regarded as being defective. Otherwise, the flexible pouch is regarded as being non-defective.

Indeed, since the internal surfaces of the two plates 40, 42 are rough, the flexible pouch 14 does not adhere to them. Hence, the gas introduced into the flexible pouch 14 can escape from it if the flexible pouch 14 is punctured.

Alternatively, the two plates 40, 42 have an internal surface which comprise a porous material, for example a porous fleece material. The fleece can be for example a non-woven fabric which comprises wires of polypropylene, the thickness of the fleece is about 440 micrometers. The fleece can also be a woven fabric which comprises wires of stainless steel whose diameter is less than 90 micrometers. The fleece can be for example non-woven fabric which comprises wires of polyamide whose diameter is less than 100 micrometers. The internal surfaces of the two plates 40, 42 can also comprise a fumed silica coating which provides a rough surface.

The above mentioned internal surfaces of the two plates 40, 42 are able to allow a gas which escape from a hole on the flexible pouch 14 flowing between the internal surface of at least one plate 40, 42 and an external surface of the flexible pouch 14.

The two plates 40, 42 can be the two plates 12A, 12B of the protecting body 12. Hence, the internal surfaces of the two plates 12A, 12B have the features of the two plates 40, 42. The leak test method can also be performed with the second system 100 as above described. Hence, the two plates 12A, 12B are surrounded by the two frames 112A, 112B as above described.

Figure 18:
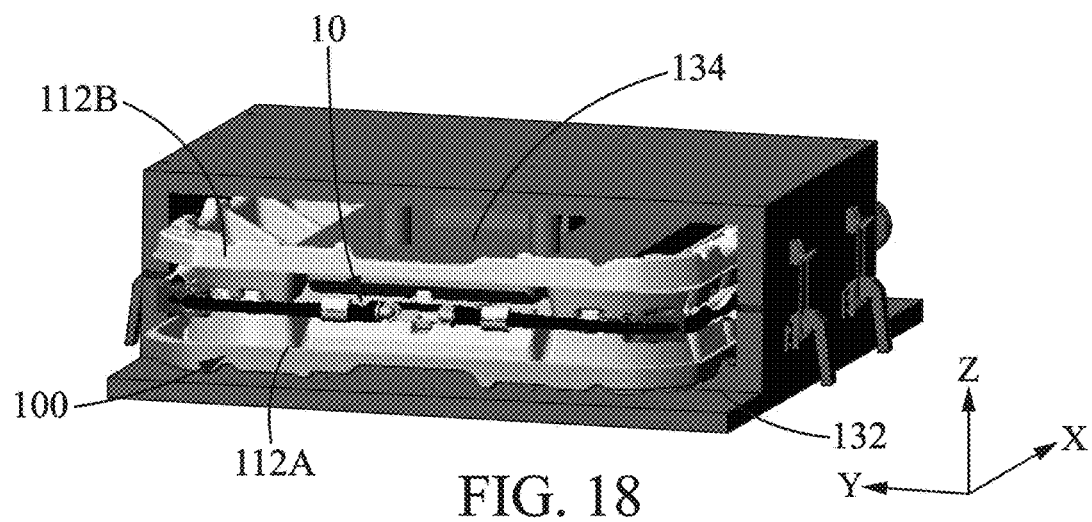
FIG. 18 shows a perspective view of the second system during one step of the leak test.
Figure 19:
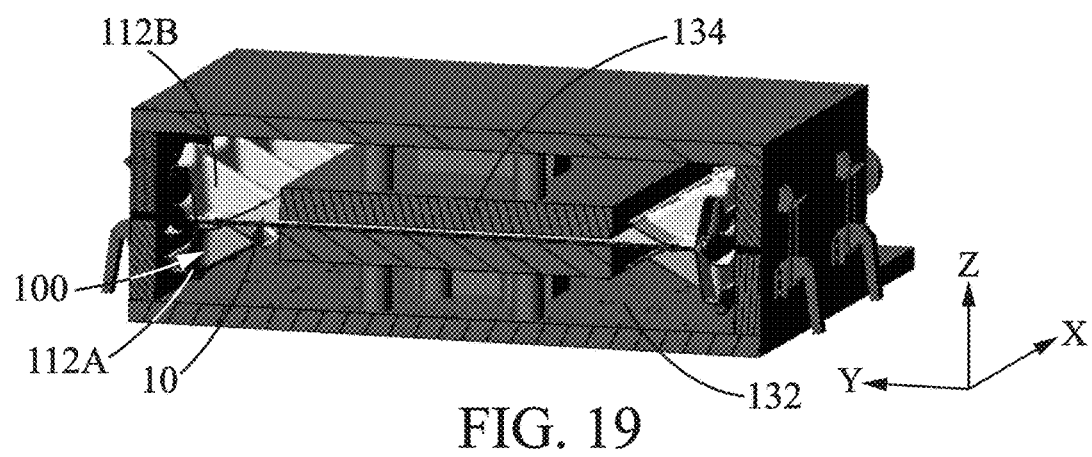
FIGS. 19 and 20 show sectional views of respectively second and first systems during one other step of the leak test.
Figure 20:
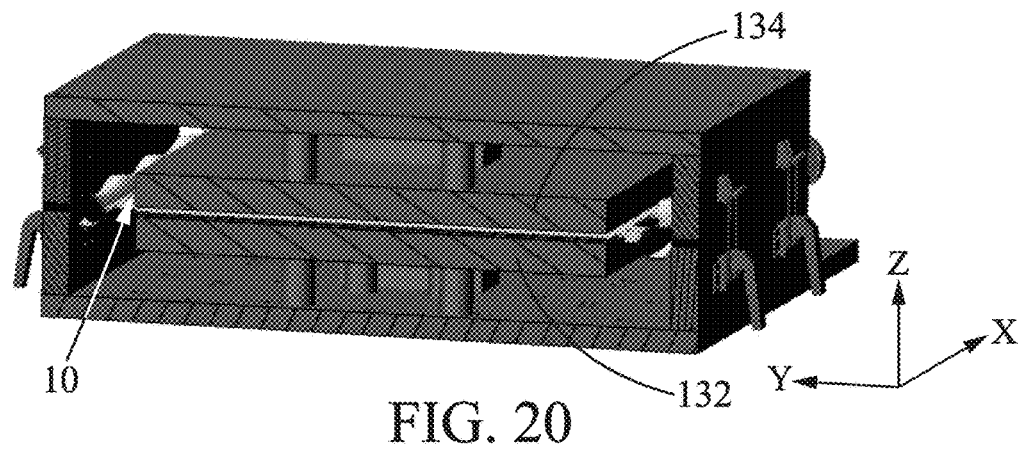

Another method for detecting a leak in the flexible pouch 14 will be now described with respect to FIGS. 18, 19 and 20.

The test is performed on the second system 100 but could also be performed on system 10. Only the difference with the first method will be described.

As one can see on FIGS. 18 and 19, before the gas is introduced within the flexible pouch 14, the two plates 12A, 12B, which have features of the bodies 40, 42, are arranged between two compressing bodies 132, 134. These compressing bodies 132, 134 are able to limit the expansion of the two plates 12A, 12B and the flexible pouch 14 when the gas is introduced within the flexible pouch 14. The body 132 forms a lower compressing body, with respect to the vertical axis (Z) when the system 10 extends in the horizontal main plane (XY), and the body 134 forms an upper compressing body.

Then, as illustrated on FIG. 19, when the two plates 12A, 12B and the flexible pouch 14 are arranged between the two compressing bodies 132, 134 the expansion of the flexible pouch 14 is limited by the two compressing bodies 132, 134, thus allowing a pressure measurement. A dimension, following the vertical axis (Z) which is perpendicular to the main plane (XY) between the two compressing bodies can be comprised between 5 millimeters and 15 millimeters and more particularly 5, 7, 10 or 15 millimeters.

Next, as previously described, a gas is introduced within the flexible pouch 14 and after the gas has been introduced, the pressure is measured within the flexible pouch 14 during a predetermined duration.

An operator can define a pressure drop threshold. If the measured drop pressure is above this threshold, the flexible pouch is regarded as being defective and a leak is considered as being detected. Otherwise, the flexible pouch is regarded as being non-defective.

For example, for if the above mentioned dimension between the two compressing bodies 132, 134 is 7 millimeters and the predetermined duration is 300 seconds, the pressure drop threshold is 3.1 mbar. If the above mentioned dimension between the two compressing bodies 132, 134 is 5 millimeters and the time during which the gas in introduced into the flexible pouch is 600 seconds, the pressure drop threshold is 7.2 mbar.

When the leak test method is performed with the system 100, as illustrated on FIG. 19, the two compressing bodies 132, 134 are in touch with a portion of the part of the two plates 12A, 12B which are in touch with the flexible pouch 14. Here, the portion is 70% but can also be 80% or 90%.

When leak test method is performed with the system 10, as illustrated on FIG. 20, the two compressing bodies 132, 134 are in touch with all of the part, or 100%, of the two plates 12A, 12B which are in touch with the flexible pouch 14.

Of course, the invention in its broadest aspects is not limited to the specific detail above shown and described. Consequently, departures may be made from the details described herein without departing from the spirit and scope of the invention.

In this embodiment, the flexible pouch 14 is specifically designed to be able to contain up to 100 liters of biopharmaceutical fluid. However, the flexible pouch 14 can have a maximum volume capacity which is different, for example of 10 liters or 50 liters. The strength of the attachment system 18 can thus be adjusted by varying the number of snap buttons 20.

The attachment system 18 can also be a removable attachment system 18. Thus, an operator can, if needed, detach the two plates 12A, 12B from each other.

In this embodiment, the two plates 12A, 12B are opaque. More broadly, only one of the two plates 12A, 12B can be opaque. Alternatively, at least one of the two plates 12A, 12B can be transparent. The two plates 12A, 12B can be made of plastic material, and more particularly one and/or more of copolyester or polyethylene terephthalate.

Moreover, to increase the adherence between the two plates 12A, 12B of the protective body 12, the internal surfaces of the two plates 12A, 12B can be coated with an adhesive.

The invention claimed is:

1. A leak test for a flexible pouch specifically designed to contain a biopharmaceutical fluid, the leak test comprising the following steps:
sandwiching the flexible pouch between two plates of plastic material which have an internal surface able to allow gas which escape from a hole on the flexible pouch flowing out of an external surface of the flexible pouch, so that the flexible pouch is in an first assembled state in which the flexible pouch has:
a first face in contact with one of the two plates, and
a second face opposite to the first face, in contact with the other one of the two plates,
introducing a gas within the flexible pouch when the flexible pouch is already in the first assembled state with the two plates in contact with the flexible pouch, and
measuring the pressure within the flexible pouch,
wherein two frames, each of annular shape to form a peripheral area, are fixed to each other such that they surround the two plates, the two plates being part of a protecting body that extends between the flexible pouch and the two frames in a second assembled state, the gas being introduced after successively obtaining the first assembled state of the flexible pouch with the two plates in contact with the flexible pouch and obtaining the second assembled state.

2. The leak test according to claim 1, wherein after the gas has been introduced within the flexible pouch, a pressure change is measured in the flexible pouch during a predetermined duration.

3. The leak test according to claim 1, wherein an expansion of the flexible pouch and the two plates is limited by two compressing bodies, in a direction perpendicular to a main plane of the two plates.

4. The leak test according to claim 3, wherein a dimension, in the direction perpendicular to the main plane of the two plates, between two respective internal surfaces of the two compressing bodies is between 5 millimeters and 15 millimeters.

5. The leak test according to claim 4, wherein the two compressing bodies are respectively in touch with a portion of the part of the two plates which is in touch with the flexible pouch.

6. The leak test according to claim 3, wherein the two compressing bodies are respectively in touch with a portion of the part of the two plates which is in touch with the flexible pouch.

7. The leak test according to claim 6, wherein the portion is 70% or 80% or 90% or 100%.

8. The leak test according to claim 1, wherein at least one of the two plates has an internal surface which is rough or corrugated.

9. The leak test according to claim 1, wherein at least one of the two plates has an internal surface which is porous.

10. A leak test for a flexible pouch specifically designed to contain a biopharmaceutical fluid, the leak test comprising the following steps:
sandwiching the flexible pouch between two plates of plastic material which have an internal surface able to allow gas which escape from a hole on the flexible pouch flowing out of an external surface of the flexible pouch, so that the flexible pouch is in an first assembled state in which the flexible pouch has:
a first face in contact with one of the two plates, and
a second face opposite to the first face, in contact with the other one of the two plates,
introducing a gas within the flexible pouch when the flexible pouch is already in the first assembled state with the two plates in contact with the flexible pouch, and measuring the pressure within the flexible pouch, wherein an expansion of the flexible pouch and the two plates is limited by two compressing bodies, in a direction perpendicular to a main plane of the two plates, the two compressing bodies comprising a first compression plate and a second compression plate, wherein the first compression plate and the second compression plate are set in an operating state, before introducing the gas within the flexible pouch, for limiting expansion of the flexible pouch and the two plates, and wherein the flexible pouch is sandwiched between the two plates before obtaining the operating state of the first compression plate and the second compression plate.

11. A leak test for a flexible pouch specifically designed to contain a biopharmaceutical fluid, the leak test comprising:

sandwiching the flexible pouch between two plates which have an internal surface able to allow gas which escape from a hole on the flexible pouch flowing out of an external surface of the flexible pouch;

limiting an expansion of the flexible pouch and the two plates by two compressing bodies, in a direction perpendicular to a main plane of the two plates;

fixing two frames to each other such that they surround the two plates, each of the two frames being of annular shape to form a peripheral area;

introducing a gas within the flexible pouch; and measuring pressure within the flexible pouch.

12. The leak test according to claim 11, wherein a first frame and a second frame, which are two frames each of annular shape to form a peripheral area, are fixed to each other such that they surround the two plates, the two plates being part of a protecting body that extends between the flexible pouch and the two frames, so that:

a main plane of a first plate chosen amongst the two plates extends between the flexible pouch and the first frame, and a main plane of a second plate chosen amongst the two plates extends between the flexible pouch and the second frame.

13. The leak test according to claim 12, further comprising:

after sandwiching the flexible pouch between two plates, limiting an expansion of the flexible pouch and the two plates by two compressing bodies, in a direction perpendicular to a main plane of the two plates, wherein a distance between the two compressing bodies is comprised between 5 millimeters and 15 millimeters before the gas is introduced within the flexible pouch.

14. The leak test according to claim 11, wherein at least one of the two plates has an internal surface which comprises a fumed silica coating.

15. The leak test according to claim 11, wherein at least one of the two plates has an internal surface which comprises a porous fleece material.

16. A leak test for a flexible pouch specifically designed to contain a biopharmaceutical fluid, the leak test, successively comprising:

sandwiching the flexible pouch between two plates which have an internal surface able to allow gas which escape from a hole on the flexible pouch flowing out of an external surface of the flexible pouch, so that the flexible pouch is in an first assembled state in which the flexible pouch has:

a first face in contact with one of the two plates, and a second face opposite to the first face, in contact with the other one of the two plates;

fixing two frames to each other such that they surround the two plates, each of the two frames being of annular shape to form a peripheral area, the two plates being part of a protecting body that extends between the flexible pouch and the two frames, in a second assembled state;

introducing a gas within the flexible pouch; and measuring pressure within the flexible pouch.

* * * * *